Feb. 20, 1923.

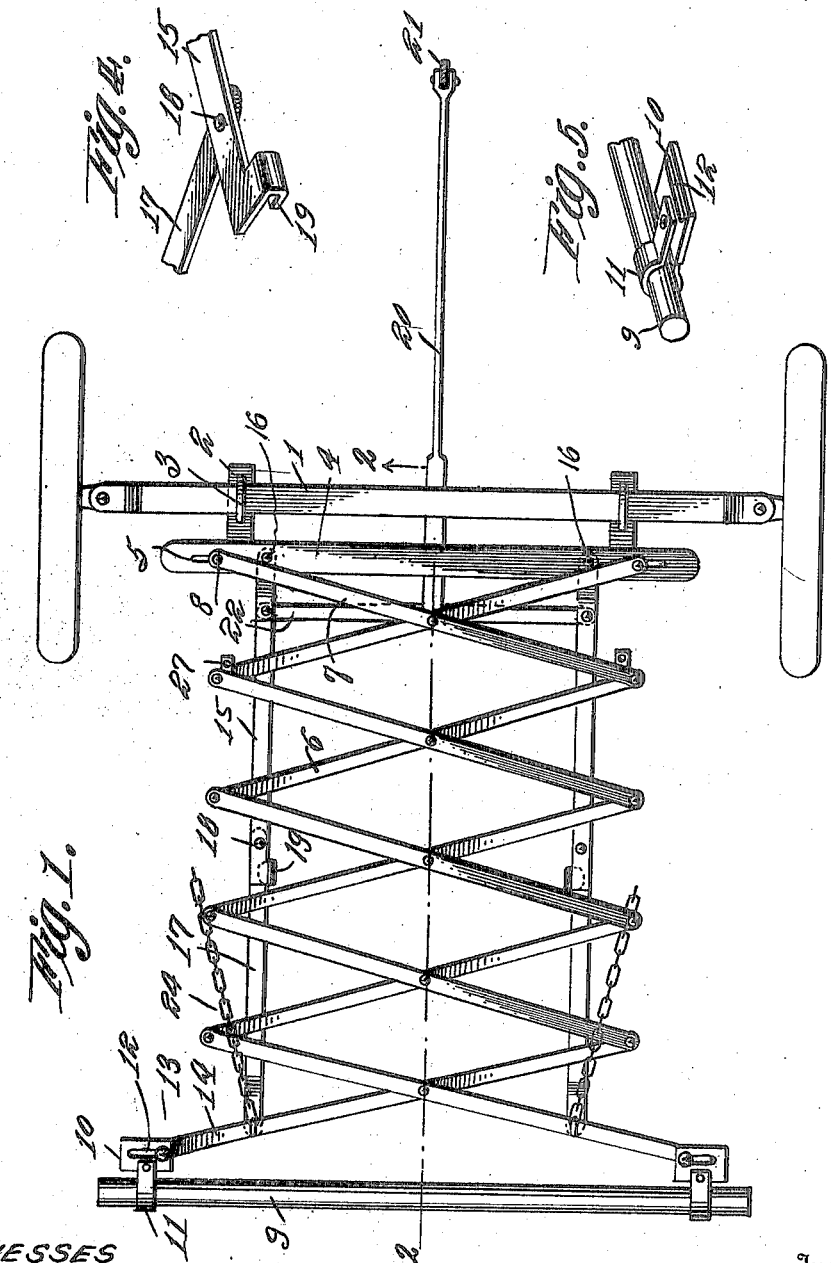

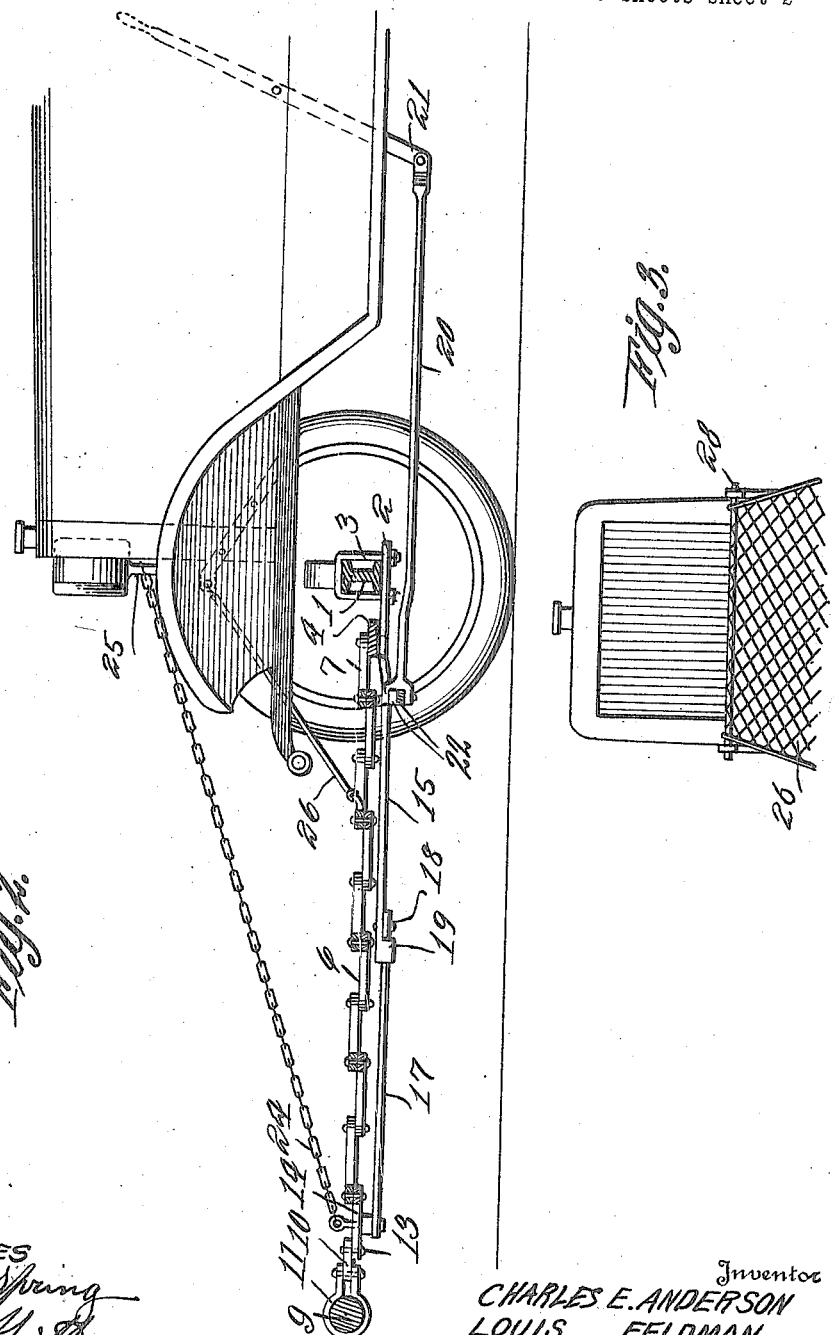

C. E. ANDERSON ET AL 1,445,655

LIFE GUARD

Filed Oct. 12, 1922

WITNESSES

Inventor
CHARLES E. ANDERSON
LOUIS FELDMAN

By Richard B. Owen, Attorney

Patented Feb. 20, 1923.

1,445,655

UNITED STATES PATENT OFFICE.

CHARLES E. ANDERSON AND LOUIS FELDMAN, OF SIOUX FALLS, SOUTH DAKOTA.

LIFE GUARD.

Application filed October 12, 1922. Serial No. 594,142.

*To all whom it may concern:*

Be it known that we, CHARLES E. ANDERSON and LOUIS FELDMAN, citizens of the United States, residing at Sioux Falls, in the county of Minnehaha and State of South Dakota, have invented certain new and useful Improvements in a Life Guard, of which the following is a specification.

The present invention relates to a guard for vehicles and especially for automobiles having for its principal object to provide a fender so as to prevent injury to a person with whom a vehicle may collide.

Another important object of the invention is to provide a guard or fender of this nature which may be quickly extended to an operative position and when extended will be prevented from retracting accidentally.

With the above and numerous other objects in view which will appear as the description progresses, the invention resides in certain novel features of construction, combination and arrangement of parts as will be hereinafter more fully described and claimed.

In the drawings:—

Figure 1 is a plan view showing the fender in an extended position,

Figure 2 is a vertical section taken therethrough substantially on the line 2—2 of Fig. 1, Figure 3 is a detail view showing the manner in which the same is mounted, Figure 4 is a fragmentary detail perspective of the connection of two arms used in conjunction with the invention, Figure 5 is a detail perspective of one end of the rod showing a plate clamped thereto, Figure 6 is a plan view showing the fender in a contracted position, and, Figure 7 is a plan view showing details particularly of members 4 and 17.

Referring to the drawing in detail it will be seen that 1 represents the front axle of an automobile which is of conventional construction and has fixed thereto a pair of plates 2 in spaced relation to each other by the U-shaped bolts 3. These plates 2 extend forwardly of the automobile axle 1 and support a bar 4 which is provided with slots 5 adjacent its ends. A lazy tong structure indicated generally at 6 has its inner arms 7 provided with depending bolts or pins 8 which engage the bar 4 through the slots 5. A bumper rod 9 has supported adjacent its ends the plates 10 by means of the clamps 11. The plates 10 are provided with slots 12 for receiving the bolts or pins 13 of the forward arms 14 of the lazy tong structure 6. A pair of arms 15 are pivoted to the bar 4 as at 16, and a second pair of arms 17 are pivoted to the arms 15 adjacent the ends of the arms 15 as at 18. The other ends of the arms 17 are pivoted to the intermediate portions of the forward arms 14 of the lazy tong structure 6. An operating rod 20 controlled by the conveniently positioned lever 21 is pivoted at its ends to a pair of links 22, the outer ends of which are pivoted to intermediate portions of the arms 15. It will thus be seen that by fulcruming the lever 21 the lazy tong structure may be extended or retracted as desired through the intermediacy of the operating rod 20, links 22 and arms 15 and 17.

A pair of chains or other similar devices 24 are attached at their forward ends to the arms 14, and at their rear ends to the light brackets 25 or any other suitable portion of the vehicle whereby the fender may be efficiently braced when in an extended position as shown in Fig. 1. It is to be also noted that a net 26 is attached to the lazy tong structure 6 intermediate its ends preferably by being bolted to the links 27 provided at the ends of adjacent arms of the lazy tong structure, and the other end thereof is fixed to a portion of the automobile, the rod 28 preferably being provided for this purpose. This net 26 may be of any construction desired, such as a mesh or a strap structure. The purpose of the net 26 is to prevent the head of the victim from coming into contact with the forward portion of the vehicle when he is dumped upon the fender.

Particular attention is called to the construction of the operating parts of the device which include the operating bar 20, links 22 and arms 15 and 17. When the operating bar 20 is moved so as to extend the lazy tong structure it will be noted that this will be accomplished with great rapidity in action which is necessary for the efficient operation of a device of this nature since the parts must act on the spur of the moment when the operator discovers the danger of colliding with some person. These parts, have therefore, been constructed so that a slight movement of the lever 21 is sufficient to open the lazy tong structure very quickly.

Although we have described our invention with some degree of particularity it is to be understood that the present embodiment thereof has merely been shown by way of example and that numerous changes in the details of construction and in the combination and arrangement of parts may be resorted to without departing from the scope of the invention as hereinafter claimed.

Having thus fully described our invention what we claim as new is:—

A device of the class described including a bar, a bumper rod, a lazy tong structure disposed between the bumper rod and the bar, an operating rod, a pair of links attached to the operating rod, a pair of arms pivoted to the bar, a second pair of arms pivoted to the first mentioned arms intermediate their ends and to the arms of the lazy tong structure adjacent the bumper rod, said first mentioned arms provided with hooked extensions for receiving the second mentioned pair of arms so as to hold the arms in alignment with each other when the lazy tong structure is extended, said links being pivoted to the first mentioned arms intermediate their ends for operation thereof in the manner and for the purpose specified.

In testimony whereof we affix our signatures in presence of two witnesses.

CHARLES E. ANDERSON.
LOUIS FELDMAN.

Witnesses:
  B. O. STORDAHL,
  LUCILLE VANDALL.